Aug. 22, 1950  S. W. AYERS  2,520,082
GRAPEFRUIT KNIFE
Filed Nov. 12, 1947
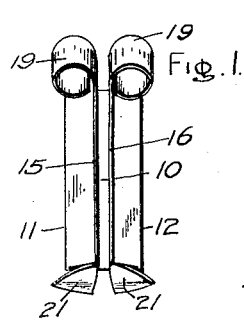
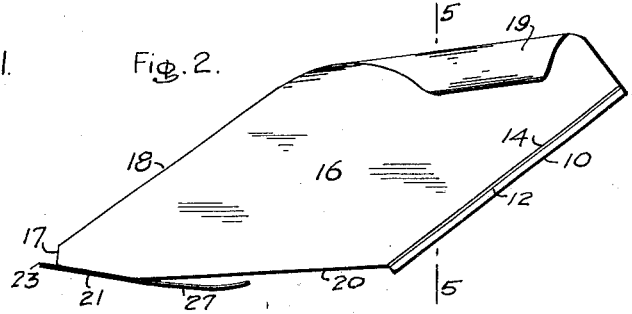
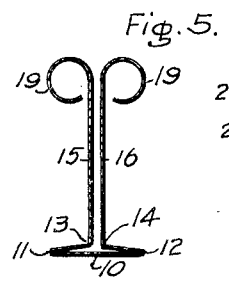
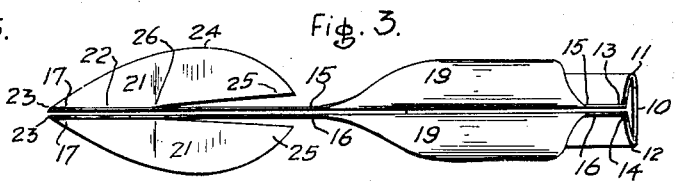
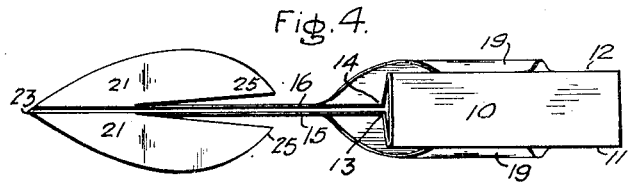
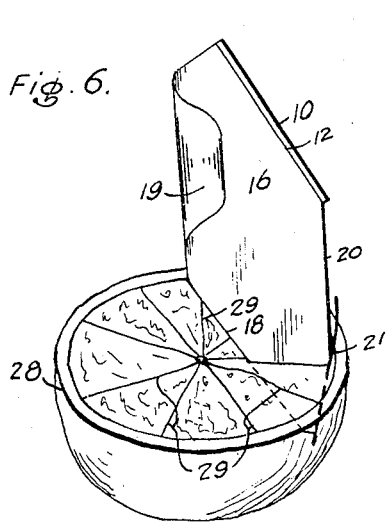
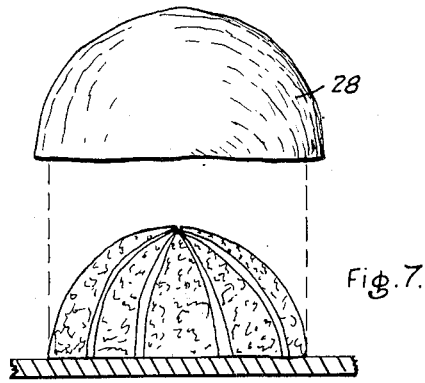
Silas W. Ayers
INVENTOR
BY *P. J. Elliott*
ATTORNEY Patented Aug. 22, 1950

2,520,082

UNITED STATES PATENT OFFICE 2,520,082

GRAPEFRUIT KNIFE

Silas W. Ayers, Tacoma, Wash.

Application November 12, 1947, Serial No. 785,375

1 Claim. (Cl. 30—24)

This invention relates to devices for separating the fruit pulp from the rind of a halved grape fruit, or other similar fruit, without cutting the membranes which divide the fruit into segments, thereby avoiding rendering the fruit pulp bitter.

The objects of my invention are, first, to provide a tool which will quickly and neatly provide clear sections of the grape fruit, entirely free from the rind and from the separating membranes without any substantial waste of the edible pulp; second, to provide a tool which will avoid cutting or otherwise damaging the membranes by which the bitter oil therein is released into the pulp; third, to construct this tool of a single piece of metal, all parts thereof being integral therewith; and fourth, to provide such a tool which is easy to make and to use, and which effectively and quickly performs its functions.

I attain these and other objects by the devices and arrangements illustrated in the accompanying drawings, in which:

Fig. 1 is a front view of my improved tool; Fig. 2 is a side elevation thereof; Fig. 3 is a top plan view thereof; Fig. 4 is a bottom plan view thereof; Fig. 5 is a section thereof, taken on the line 5—5 in Fig. 2; Fig. 6 is a view illustrating my tool starting to cut on each side of a membrane; and Fig. 7 shows the grape fruit pulp completely separated from the rind and from all the membranes.

Identical numerals of reference refer to the same parts throughout the several views.

It is highly desirable in preparing salads and other dishes with grape fruit, to do so without cutting the membranes dividing the fruit into segments, on account of the bitter oil which exudes from such cut membrane and which quickly permeates the adjacent pulp in both sections thereof. It is also desirable to free the pulp of the fruit from the rind and the membranes with as little damage thereto as possible, since such damage causes a loss of fruit juice contained in the individual cells thereof. With these ideals in mind attempts have been made to provide tools or knives for the purpose. Some of these tools cut the membrane from the rind in the process of extracting the individual sections; others cut the pulp free of the membrane on one side only, tearing the pulp away from the other membrane and therefore damaging the pulp; another cuts the membrane from the rind, thus freeing much of the oil while cutting the pulp from the membrane but not from the rind; and still another peels the rind from the fruit, thus cutting all the membranes at the rind and freeing much of the objectionable oil, and then separates the individual sections from the membranes; and still another only partially separates the pulp from both the rind and the membrane. This latter solution is defective on account of the location of the knives for cutting the pulp from the rind. None of the above mentioned tools completely solves the problem of cutting the pulp from the rind and from the membranes at the same time, without cutting the membrane or damaging the pulp.

Referring now to the drawings wherein I have illustrated my improved tool. This tool comprises a single piece of very thin steel, or other suitable metal, cut to form a symmetrical blank about a central axis, and bent to form the various portions of the tool. The tool thus formed comprises two closely associated knives adapted to cut the pulp of a grape fruit away from both sides of a single membrane, and simultaneously to completely cut the pulp from the rind between the two adjacent membranes, without cutting either of the membranes.

The backbone of my tool is formed by a flange 10 on each side of the central axis of the blank, bent back on itself at 11 and 12 and then bent outward at 13 and 14 and extending in two parallel planes 15 and 16, which extend forward from the backbone flange 10.

These planes 15 and 16 are of the same shape and dimensions and are each cut to form a short vertical knife edge 17, at the most forward point, an inclined forward edge 18 a rolled top 19 adapted to be gripped by the hand of the operator, and a bottom edge 20 extending from the lower ends of the bends 13 and 14 to the lateral pulp blades 21, and thence at a slight angle to the lower end of the vertical knife edge 17. At this portion the planes 15 and 16 are bent outward to form the said pulp blades 21.

These blades 21 extend outward substantially at right angles to their respective planes 15 and 16 and are complementarily shaped. They are attached to their planes 15 or 16 only for a short distance at their front ends at 22. They come to a sharp point 23 slightly in advance of the front cutting edges 17 and flare outward therefrom along a curved line to a maximum width at 24, when their width is less than the normal outer width of a grape fruit segment. The rear portion of these blades curves inward to a sharp point 25 well separated from the planes 15 or 16 and thence forward to the connection 26 with the said planes. This rear portion is bent slightly upward on a curve 27 from the said connection 26 to the point 25, as shown in Figs. 2 and 6.

My improved knife is used in the following manner: The grape fruit is first cut across its center to form two hemispherical bodies 28. One of these bodies is held in one hand and the knife is held in the other with the thumb and index finger engaging the planes 15 and 16 and the palm engaging the two rolled portions 19. The points 23 of the blades 21 are then inserted in the fruit, one on each side of a membrane 29, at the rind (Fig. 6) and the planes 15 and 16 are compressed so as to almost touch the two sides of the membrane, then the knife is given a downward and forward curving motion, following the shape of the rind. The membrane separates the two planes 15 and 16 and the blades 21 cut the pulp from the rind. The knife is then withdrawn by reversing its above described motion and the fruit is rotated in the hand to bring the next membrane 29 into position.

The above described action is then repeated on each succeeding membrane until all have been cut free from their adjacent pulp. The fruit 28 may now be turned up-side-down and the individual sections of pulp will fall therefrom as shown in Fig. 7, leaving all the membranes attached to the rind. The pulp segments will be found to be substantially whole and undamaged and substantially free from the bitter oil of the membranes.

It is, of course, understood that changes in the details of my improved grape fruit knife may be made without departing from the spirit of my invention as outlined in the appended claim.

Having described my invention, what I claim and desire to secure by Letters Patent is:

An article of the class described comprising a unitary structure of extreme thinness bent into two parallel planes, each plane having a cutting edge, the lower front portions of said planes being bent substantially at right angles to said planes and formed into two narrow cutting blades attached to said planes only at their forward portions and extending rearward in expanding lines therefrom, and slightly curved upward on their rearward extensions.

SILAS W. AYERS.

REFERENCES CITED

The following references are of record in the file of this patent:

UNITED STATES PATENTS

| Number | Name | Date |
| --- | --- | --- |
| 1,115,001 | Merrill | Oct. 27, 1914 |
| 1,261,954 | Newman | Apr. 9, 1918 |
| 1,468,648 | Polk | Sept. 25, 1923 |
| 2,051,680 | Collens | Aug. 18, 1936 |